United States Patent
Hetherington et al.

(10) Patent No.: US 6,460,015 B1
(45) Date of Patent: Oct. 1, 2002

(54) METHOD, SYSTEM AND COMPUTER PROGRAM PRODUCT FOR AUTOMATIC CHARACTER TRANSLITERATION IN A TEXT STRING OBJECT

(75) Inventors: David James Hetherington, Austin, TX (US); David Bruce Kumhyr, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,812

(22) Filed: Dec. 15, 1998

(51) Int. Cl.7 ............................. G06F 17/20; G06F 7/00
(52) U.S. Cl. ............................. 704/8; 707/536; 345/467
(58) Field of Search ..................... 704/1, 7, 8; 707/530, 707/7, 536, 101, 102, 103; 345/467; 341/90

(56) References Cited

U.S. PATENT DOCUMENTS

| | | | |
|---|---|---|---|
| 4,379,288 A | | 4/1983 | Leung et al. |
| 4,384,329 A | * | 5/1983 | Rosenbaum et al. |
| 4,544,276 A | | 10/1985 | Horodeck |
| 4,611,280 A | * | 9/1986 | Linderman |
| 4,641,264 A | | 2/1987 | Nitta et al. |
| 4,706,212 A | | 11/1987 | Toma |
| 4,730,270 A | * | 3/1988 | Okajima et al. |
| 4,737,040 A | | 4/1988 | Moon |
| 4,951,202 A | | 8/1990 | Yan |
| 4,954,984 A | * | 9/1990 | Kaijima et al. |
| 4,962,452 A | * | 10/1990 | Nogami et al. |
| 5,040,218 A | | 8/1991 | Vitale et al. |
| 5,056,021 A | | 10/1991 | Ausborn |
| 5,091,878 A | * | 2/1992 | Nagasawa et al. |
| 5,109,352 A | | 4/1992 | O'Dell |
| 5,136,503 A | * | 8/1992 | Takagi et al. |
| 5,164,900 A | * | 11/1992 | Bernath |
| 5,175,803 A | | 12/1992 | Yeh |

(List continued on next page.)

FOREIGN PATENT DOCUMENTS

| | | |
|---|---|---|
| JP | 57-199070 | 12/1982 |
| JP | 5-224687 | 9/1993 |
| JP | 7-261652 | 10/1995 |
| JP | 7-271793 | 10/1995 |
| JP | 9-62679 | 3/1997 |
| JP | 9-237270 | 9/1997 |
| WO | WO 97/404 | 10/1997 |

OTHER PUBLICATIONS

U.S. patent application Ser. No. 09/211,810, Hetherington et al., filed Dec. 15, 1998.

U.S. patent application Ser. No. 09/211,809, Hetherington et al., filed Dec. 15, 1998.

(List continued on next page.)

*Primary Examiner*—Patrick N. Edouard
(74) *Attorney, Agent, or Firm*—Marilyn Smith Dawkins; Bracewell & Patterson, L.L.P.

(57) ABSTRACT

A three-field text string class is employed for data entered in a language which does not employ the latin alphabet or latin character set, but does employ a character set which may be readily sound-mapped to the latin character set. The entered text is stored in a first field of the text string class, while an automatically transliterated representation of the data entered is stored in a second field. The transliteration is generated utilizing a character-mapping resource file table specific to the language in which the text was entered and the language employing the latin character set. The contents of the second field thus provide a recognizable representation of the text string to users unfamiliar with the character set of the language in which the text was entered. The second field's contents also provide a pronunciation key for the entered text string for nonspeakers. An abstract object name entered in Cyrillic characters may thus be recognized and properly pronounced by an user who only speaks English.

10 Claims, 3 Drawing Sheets

U.S. PATENT DOCUMENTS

| | | | | |
|---|---|---|---|---|
| 5,214,583 | A | * | 5/1993 | Miike et al. |
| 5,243,519 | A | * | 9/1993 | Andrews et al. |
| 5,251,130 | A | * | 10/1993 | Andrews et al. |
| 5,268,990 | A | * | 12/1993 | Cohen et al. |
| 5,307,267 | A | * | 4/1994 | Yang |
| 5,371,844 | A | | 12/1994 | Andrew et al. |
| 5,377,317 | A | | 12/1994 | Bates et al. |
| 5,384,700 | A | | 1/1995 | Lim et al. |
| 5,390,295 | A | | 2/1995 | Bates et al. |
| 5,416,903 | A | | 5/1995 | Malcolm |
| 5,418,718 | A | * | 5/1995 | Lim et al. .................. 704/8 |
| 5,420,976 | A | | 5/1995 | Schell et al. |
| 5,426,583 | A | * | 6/1995 | Uribe-Echebarria Diaz De Mendibil |
| 5,432,948 | A | * | 7/1995 | Davis et al. |
| 5,434,777 | A | | 7/1995 | Luciw |
| 5,440,482 | A | * | 8/1995 | Davis |
| 5,448,474 | A | | 9/1995 | Zamora |
| 5,485,373 | A | | 1/1996 | Davis et al. |
| 5,490,061 | A | | 2/1996 | Tolin et al. |
| 5,523,946 | A | | 6/1996 | Kaplan et al. |
| 5,546,575 | A | | 8/1996 | Potter et al. |
| 5,550,965 | A | | 8/1996 | Gabbe et al. |
| 5,594,642 | A | * | 1/1997 | Collins et al. |
| 5,600,779 | A | | 2/1997 | Palmer et al. |
| 5,640,581 | A | | 6/1997 | Saraki |
| 5,640,587 | A | * | 6/1997 | Davis et al. .................. 704/8 |
| 5,642,490 | A | | 6/1997 | Morgan et al. |
| 5,644,775 | A | * | 7/1997 | Thompson et al. |
| 5,649,223 | A | | 7/1997 | Freeman |
| 5,675,818 | A | * | 10/1997 | Kennedy |
| 5,677,835 | A | * | 10/1997 | Carbonell et al. |
| 5,678,039 | A | | 10/1997 | Hinks et al. |
| 5,682,158 | A | * | 10/1997 | Edberg et al. ............... 341/90 |
| 5,721,825 | A | | 2/1998 | Lawson et al. |
| 5,724,593 | A | | 3/1998 | Hargrave, III et al. |
| 5,734,887 | A | | 3/1998 | Kingberg et al. |
| 5,758,295 | A | | 5/1998 | Ahlberg et al. |
| 5,758,314 | A | * | 5/1998 | McKenna .................... 704/1 |
| 5,778,356 | A | * | 7/1998 | Heiny ......................... 707/2 |
| 5,784,069 | A | * | 7/1998 | Daniels et al. ............. 345/467 |
| 5,784,071 | A | * | 7/1998 | Tang et al. .................. 704/8 |
| 5,787,452 | A | * | 7/1998 | McKenna |
| 5,799,303 | A | * | 8/1998 | Tsuchimura |
| 5,812,964 | A | | 9/1998 | Finger ......................... 704/7 |
| 5,815,148 | A | | 9/1998 | Tanaka |
| 5,832,478 | A | * | 11/1998 | George |
| 5,844,798 | A | | 12/1998 | Uramoto |
| 5,870,084 | A | * | 2/1999 | Kanungo et al. |
| 5,872,973 | A | | 2/1999 | Mitchell et al. |
| 5,873,111 | A | * | 2/1999 | Edberg |
| 5,966,637 | A | * | 10/1999 | Kanungo et al. ........... 348/10 |
| 5,974,372 | A | | 10/1999 | Barnes et al. |
| 6,003,049 | A | * | 12/1999 | Chiang |
| 6,024,571 | A | | 2/2000 | Renegar |
| 6,028,600 | A | | 2/2000 | Rosin et al. |
| 6,144,377 | A | | 11/2000 | Oppermann et al. |
| 6,167,366 | A | * | 12/2000 | Johnson |
| 6,205,418 | B1 | | 3/2001 | Li et al. |

OTHER PUBLICATIONS

U.S. patent application Ser. No. 09/211,808, Hetherington et al., filed Dec. 15, 1998.*

U.S. patent application Ser. No. 09/211,803, Hetherington et al., filed Dec. 15, 1998.*

U.S. patent application Ser. No. 09/211,799, Hetherington et al., filed Dec. 15, 1998.

U.S. patent application Ser. No. 09/211,802, Hetherington et al., filed Dec. 15, 1998.

U.S. patent application Ser. No. 09/211,813, Hetherington et al., filed Dec. 15, 1998.

U.S. patent application Ser. No. 09/211,801, Hetherington et al., filed Dec. 15, 1998.

5721825

New Icons, Oct. 1996, IBM Technical Disclosure Bulletin, vol. 39, No. 10, pp. 25–27.

Intelligent Computer Keyboard for Entering Texts of Sinhalese and Other Similar Languages, Nov. 1992, IBM Technical Disclosure Bulletin, vol. 35, No. 6, pp. 24–27.

Enhanced Methods for Spelling Names in Speech Recognition Systems, Nov. 1995, IBM Technical Disclosure Bulletin, vol. 38, No. 11, pp. 45–46.

Method for Allowing Translation of Operator Input Comparison Strings in an Online Presentation Program, Jan. 1986, IBM Technical Disclosure Bulletin, vol. 28, No. 8, pp. 3682–3683.

Architecture for Speech Synthesis from Text Recognition Methods, Apr. 1994, IBM Technical Disclosure Bulletin, vol. 37, No. 04A, pp. 287–289.

Bridging Speech Recognition and Natural Language Processing Subsystems, Jan. 1996, IBM Technical Disclosure Bulletin, vol. 39, No. 01, pp. 229–231.

IBM Technical Disclosure Bulletin, Preprocess for Text Formatting, Jan. 1990, vol. 32 No. 8A, pp. 280–282.

IBM Technical Disclosure Bulletin, Extending Presentation Manager Container Sort Capabilities, May 1995, vol. 38 No. 05, pp. 353–354.

* cited by examiner

METHOD, SYSTEM AND COMPUTER PROGRAM PRODUCT FOR AUTOMATIC CHARACTER TRANSLITERATION IN A TEXT STRING OBJECT

RELATED APPLICATIONS

The present invention is related to the subject matter of the following commonly assigned, copending U.S. patent applications: Ser. No. 09/211,810 entitled "METHOD, SYSTEM, AND COMPUTER PROGRAM PRODUCT FOR PROVIDING A USER INTERFACE WITH ALTERNATIVE DISPLAY LANGUAGE CHOICES" and filed Dec. 15, 1998; Ser. No. 09/211,809 entitled "METHOD, SYSTEM AND COMPUTER PROGRAM PRODUCT FOR CAPTURING LANGUAGE TRANSLATION AND SORTING INFORMATION INTO A TEXT STRING CLASS" and filed Dec. 15, 1998; Ser. No. 09/211,808 entitled "METHOD, SYSTEM AND COMPUTER PROGRAM PRODUCT FOR SORTING TEXT STRINGS" and filed Dec. 15, 1998; Ser. No. 09/211,803 entitled "METHOD, SYSTEM AND COMPUTER PROGRAM PRODUCT FOR STORING TRANSLITERATION AND/OR PHONETIC SPELLING INFORMATION IN A TEXT STRING CLASS" and filed Dec. 15, 1998; Ser. No. 09/211,799 entitled "METHOD, SYSTEM AND COMPUTER PROGRAM PRODUCT. FOR ROTATING THROUGH A SEQUENCE OF DISPLAY STATES IN A MULTI-FIELD TEXT CLASS IN A GRAPHICAL USER INTERFACE" and filed Dec. 15, 1998; Ser. No. 09/211,802 entitled "METHOD, SYSTEM AND COMPUTER PROGRAM PRODUCT FOR CONTROLLING THE GRAPHICAL DISPLAY OF MULTI-FIELD TEXT STRING OBJECTS" and filed Dec. 15, 1998; Ser. No. 09/211,813 entitled "METHOD, SYSTEM AND COMPUTER PROGRAM PRODUCT FOR DISPLAYING THE CONTENTS OF ALL FIELDS IN A MULTI-FIELD TEXT STRING OBJECT" and filed Dec. 15, 1998; and Ser. No. 09/211,802 entitled "METHOD, SYSTEM AND COMPUTER PROGRAM PRODUCT FOR DYNAMIC LANGUAGE SWITCHING IN A MULTI-FIELD TEXT STRING OBJECT VIA MESSAGING" and filed Dec. 15, 1998. The content of the above-referenced applications is incorporated herein by reference.

BACKGROUND OF THE INVENTION

1. Technical Field

The present invention relates in general to text string representations in data processing systems and in particular to mapping text strings from one character set to another. Still more particularly, the present invention relates to automatically generating and saving a text string entered in one character set together with a sound-mapped representation of the same text string in another character set.

2. Description of the Related Art

Multinational companies often run information system (IS) networks which span multiple locales spread around the globe. To maximize the usefulness of such networks, operations within each country tend to run in the local language of the country. Where possible, names of abstract objects in user applications are in the local language and match the local language organization, city, or human names which the abstract objects represent. In the case of system management software, often abstract objects would represent each of a global enterprise's local offices.

Central management of such a global network may be difficult or impossible when abstract object names utilize the local language and the local language's underlying character set. For offices located in Egypt, abstract objects would most naturally be named in Arabic; for those in Russia, object names would utilize the Cyrillic character set. A problem arises, however, when a enterprise's headquarters IS staff attempts to examine these objects. The IS staff at the multinational headquarters located in the United States is unlikely to be able to read Arabic or recognize Cyrillic characters.

Hebrew, for example, is a language which employs a character set unfamiliar to most users. Users unfamiliar with those characters will have difficulty identifying a particular abstract object named in Hebrew. Merely seeing a character provides no clue as to the character's identity, and even the seemingly simple task of describing a character over the telephone can be extremely challenging. Consider, for example, how to describe the characters "ד רשׁ ה" over the telephone without some knowledge of the Hebrew character set. Add to this problem the complication that Hebrew is conventionally written as a right-to-left language, so that the characters actually appear to the user as "תשׁ ר ד", and the difficulty of simply discussing abstract object names in Hebrew over the telephone with a counterpart becomes virtually insurmountable.

It would be desirable, therefore, to automatically generate and save a text string: entered in one character set together with the same text string sound-mapped to characters in another character set.

SUMMARY OF THE INVENTION

It is therefore one object of the present invention to provide an improved method and apparatus for generating text string representations in data processing systems.

It is another object of the present invention to provide a method and apparatus for mapping text strings from one character set to another in data processing systems.

It is yet another object of the present invention to provide a method and apparatus for automatically generating and saving a text string entered in one character set together with a sound-mapped representation of the same text string in another character set.

The foregoing objects are achieved as is now described. A three-field text string class is employed for data entered in a language which does not employ the latin alphabet or latin character set, but does employ a character set which may be readily sound-mapped to the latin character set. The entered text is stored in a first field of the text string class, while an automatically transliterated representation of the data entered is stored in a second field. The transliteration is generated utilizing a character-mapping resource file table specific to the language in which the text was entered and the language employing the latin character set. The contents of the second field thus provide a recognizable representation of the text string to users unfamiliar with the character set of the language in which the text was entered. The second field's contents also provide a pronunciation key for the entered text string for nonspeakers. An abstract object name entered in Cyrillic characters may thus be recognized and properly pronounced by an user who only speaks English.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
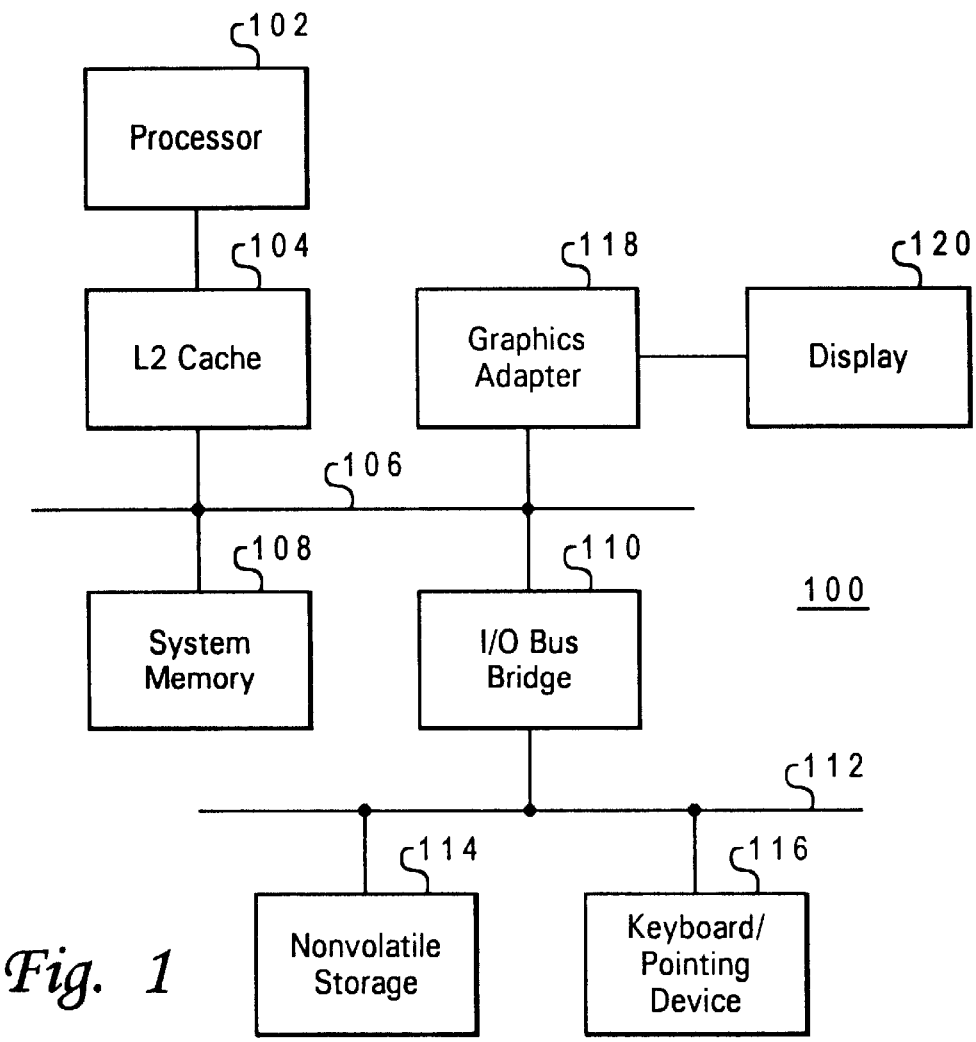
FIG. 1 depicts a diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the Aptiva® models of personal computers available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2:
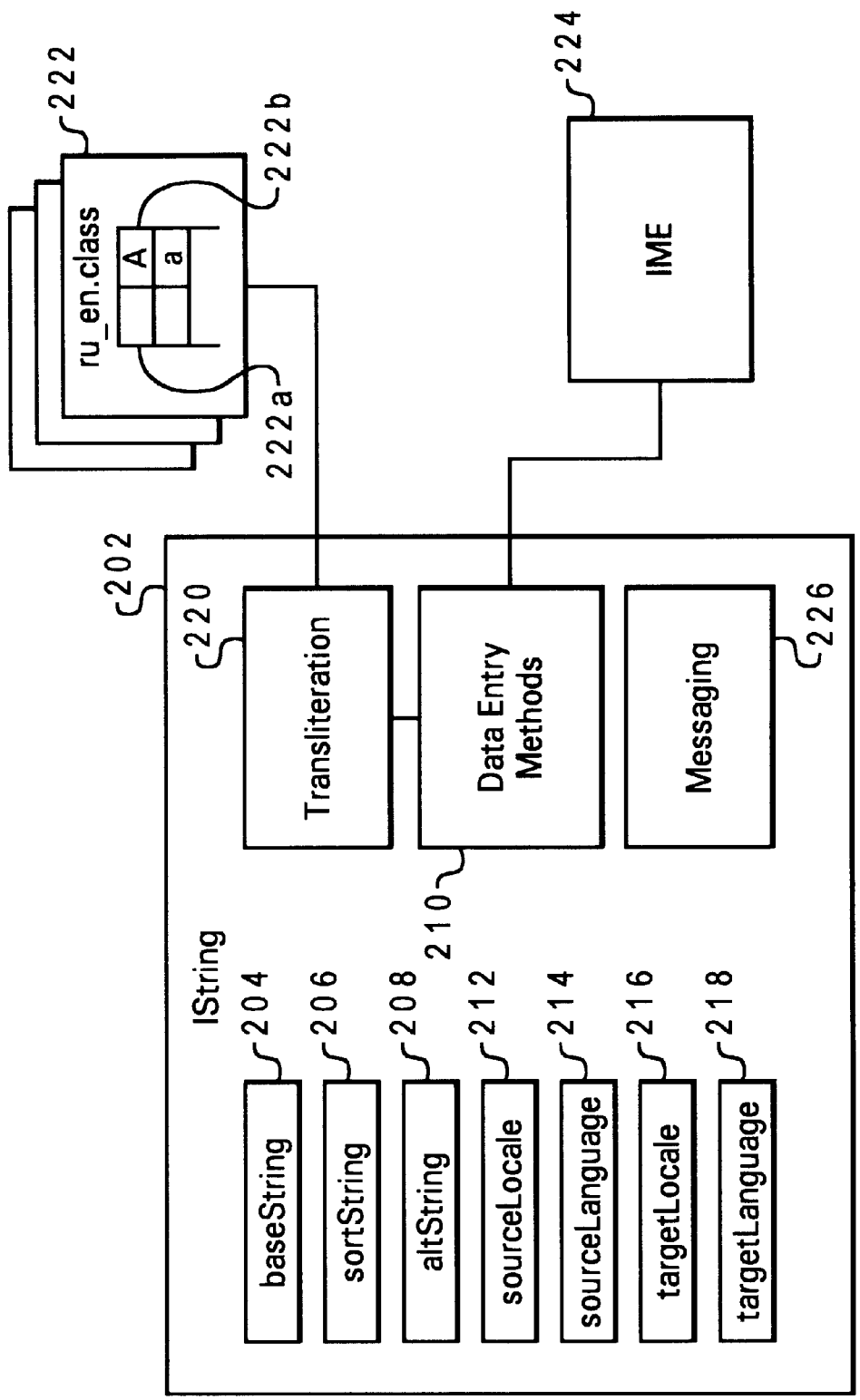
FIG. 2 is a multi-field text string class employed in entering data in a character string display field with automatic character transliteration in accordance with a preferred embodiment of the present invention.

Referring to FIG. 2, a diagram of a multi-field text string class employed in entering data in a character string display field with automatic character transliteration in accordance with a preferred embodiment of the present invention is depicted. A fundamental problem in multi-national computing environments which need to display data in multiple human languages is that a spoken word generally encapsulates information in multiple aspects or attributes, such as through the word's meaning, from context, and/or from inflection. When reduced to a visual or electronic representation for manipulation or display in a data processing system, the word may lose some attributes and much of the associated meaning. Most importantly for data processing systems, a visual representation of a word may give no clues as to the correct translation or pronunciation of the word or the proper placement of a word within a specified sort order. International String ("IString") class 202 may be employed to address this problem.

IString class 202 is preferably a Java class similar to the Java String class, which behaves like the String class by including similar methods. Most of the original behavior of the String class should be preserved, with additional functionality added and utilized only as needed. IString class 202 is a datatype which captures some of the meaning of spoken words which is normally lost when the word is reduced to a visual representation. IString class 202 is preferably utilized for all object names and system messages within a system.

The IString class 202 structure includes three different strings for each name, message, data, or text object: a baseString 204, a sortString 206, and an altString 208. BaseString 204 is the string within IString class 202 employed by default in the user interface display and may contain any text, usually the original text entered by the user in the local language where the IString object is created. SortString 206 may also be any text and is employed to allow correct sorting of non-phonetic languages and languages which are difficult to sort based only on the binary value of baseString 204. AltString 208 may be any text but should conventionally be filled with a latin character set representation of the pronunciation of the data contained in baseString 204. Thus, IString class 202 includes the original text (baseString 204), a sort key (sortString 206), and a pronunciation key (altString 208) for object names, system messages, and other data.

When implemented in Java, a constructor for an IString class 202 object may be composed of the following fields:

/** The base text String */ String baseString;

/** The related text String for proper collation */ protected String sortString;

/** The related alternate text String (pronunciation key) */ protected String altString;

/** The source locale, as an ISO-3166 code; used for collation */ protected String sourceLocale;

/** The source language, as an ISO-639 code */ protected String sourceLanguage;

/** The source variant defined for EBCIDIC and case mapping */ protected String sourceVariant;

/** The target locale, as an ISO-3166 code */ protected String targetLocale;

/** The target language, as an ISO-639 code */ protected String targetLanguage;

/** The target variant defined for EBCIDIC and case mapping */ protected String targetVariant;

Complete listings of the upper-case, two letter ISO Country Codes defined by ISO-3166 and the lower-case, two letter ISO Language Codes defined by ISO-639 are readily available from a variety of sources on the Internet.

Table I illustrates how data within the IString data type 202 looks when represented as a table:

TABLE I

| Field | Type | Data |
|---|---|---|
| baseString | Java String | The user's text |
| sortString | Java String | Language/locale dependent |
| altString | Java String | Language/locale dependent |
| sourceLocale | Java String | ISO-3166 code, example "US" |
| sourceLanguage | Java String | ISO-639 code, example "en" |
| sourceVariant | Java String | Variant code |
| targetLocale | Java String | ISO-3166 code, example "JP" |
| targetLanguage | Java String | ISO-639 code, example "ja" |
| targetVariant | Java String | Variant code |

A Java constructor for a new, empty IString class object 202 where the contents are independent of language or locale may be:

```
/* * *
 * <P> </P>
 * <dt> <b> Description: </b> <dd>
 * <p> Allocate a new IString containing no characters in
      the default
 * locale. </p>
 *
 * * *
 public IString( ) {
    this.baseString=new String( );
    this.sortString=new String( );
    this.altString=new String( );
    init( );
 }
```

To allow objects of the IString class 202 datatype to be stored in an Object Database (ODB), however, and to permit manipulation of IString data by Common Object Request Broker Architecture (CORBA) applications, an Interface Definition Language (IDL) class should be defined:

```
struct IString{
string baseString;      //base test String
string sortString;      //related text String for collation
string altString;       //related alternate text String (pronunciation)
string sourceLocale;    //source locale as an ISO-3166 code
string sourceLanguage;  //source language as an ISO-639 code
string sourceVariant;   //source variant code
string targetLocale;    //target locale as an ISO-3166 code
string targetLanguage;  //target language as an ISO-639 code
string targetVariant;   //target variant code
}
```

The contents of baseString 204, sortString 206, and altString 208 are preferably but not necessarily Unicode text entered by data entry methods 210 within IString class 202. Data entry methods 210, and thus the contents of baseString 204, sortString 206, and altString 208, may depend at least in part on language and locale parameters defined by sourceLocale field 212, sourceLanguage field 214, targetLocale field 216, and targetLanguage 218.

Because data entry methods 210 are dependent on the locale and/or langauge employed by the underlying host system, creation of a new IString object 202 preferably results in the locale and language properties of the host system in which the IString object 202 is created being placed in sourceLocale field 212 and sourceLanguage field 214. A constructor for allocating a new, empty IString for a specified locale and language determined from the host system in which the IString class object 202 is being created may be:

```
/* * *
 *
 * <P> <P>
 * <dt> <b> Description:</b> <dd>
 * <p> Allocate a new IString containing no characters in
      the
 * specified locale. </p>
 *
 * * *
 public IString(Locale loc) {
    this.baseString=new Srting( );
    this.sortString=new Srting( );
    this.altString=new Srting( );
    this.sourceLocale=loc.getLocale( );
    this.sourceLanguage=loc.getLanguage( );
    init( );
 }
```

Input of data into an IString class 202 object is preferably locale- or language-dependent. The sourceLanguage and targetLanguage properties 214 and 218 control how data is input into an IString class object 202 by data input methods 210. The sourceLanguage property 214 may be set to the language property of the host system on which the IString class object is created. The targetLanguage property 218 may also be set to that language, or may alternatively be set to a common, "universal" language such as English. Data input methods 210 compare sourceLanguage and targetLanguage properties 214 and 218 to determine what is entered into baseString 204, sortString 206, and altString 208 in an IString class object 202.

Character strings are entered into the baseString 204, sortString. 206, and altString 208 fields by data input methods 220 for IString class 202, which may selectively utilize data from either the user's direct entry or specification, from transliteration engine 220, or from the Input Method Editor (IME) 224. Where the targetLanguage property 218 is set to English as a default, data entry methods 210 determine the contents of baseString 204, sortString 206, and altString 208 fields based upon the character set employed by the language in which data is entered by the user (sourceLanguage property 214).

For languages which employ the latin character set, the user input is placed by data entry methods 220 into all three fields (baseString 204, sortString 206, and altString 208) of the IString class 202 by data entry methods 210. A suitable constructor may be:

```
/* * *
 *
 * <P> </P>
 * <dt> <b> Description: </b> <dd>
 * <p> Allocate a new IString which contains the same
      sequence of
 * characters as the string argument in the specified locale.
      </p>
 *
 * * *
 public IString(String str, Locale loc) {
    this.baseString=new String(str);
    this.sortString=new String(str);
    this.altString=new String(str);
    this.sourceLocale=loc.getLocale( );
    this.sourceLanguage=loc.getLanguage( );
    init( );
 }
```

For most locales and languages, the entered string will be input into all three fields of the IString object 202. If targetLanguage property 218 were not set to English, data entry methods 224 would input the user-entered text into all three fields whenever the languages identified in sourceLanguage and targetLanguage properties 214 and 218 employ a common character set (e.g., both employ latin characters, as in the case of Spanish and Afrikaans).

Table II illustrates how data is entered into IString class 202 fields where the host language and locale utilize the latin character set.

TABLE II

| Field | Type | Data |
|---|---|---|
| baseString | Java String | Hetherington |
| sortString | Java String | Hetherington |
| altString | Java String | Hetherington |
| sourceLocale | Java String | US |
| sourceLanguage | Java String | en |
| targetLocale | Java String | US |
| targetLanguage | Java String | en |

If desired, the fields may be individually edited and the object artificially promoted for sorting purposes by inserting a string having a lower sort value (e.g., "AAA_Hetherington") into sortString 206.

For languages which do not employ the latin character set, but which utilize a character set which may be sound mapped to the latin character set, the user input is entered by data entry methods 210 into baseString 204 and sortString 206, but a transliterated, phonetic representation of the input is placed in altString 208. An internal method within the transliteration engine 220 is employed to sound-map the passed string to a phonetic, latin character representation for altString 208 to transliterate entered characters into other characters understandable to people who are not familiar with the character set of the original language.

To generate the contents of altString 208, transliteration engine 220 selects an appropriate Java resource file 222 containing a mapping table to create the alternate text to be placed in altString 208. The selection of the particular resource file which is employed based on the combination of source and target languages. Java resource files 222 are named for the combination of languages for which the mapping is being performed. In the example shown in FIG. 2, ru_en.class is for mapping Russian (Cyrillic characters) to English (Latin characters). The structure of resource file 222 is a table with associated entries 222a–222b for foreign language characters and corresponding latin characters.

A suitable constructor for an IString object in which altString 208 is transliterated from the passed string may be:

```
/ * * *
 *
 * <P> </P>
 * <dt>< b> Description: </b> <dd>
 * <p> Allocate a new IString. The baseString and sort-
      String are the
 * passed string, the altString is transliterated into the
      target
 * language.</p>
 *
 * * * public IString(String str) {
    this.baseString=new String(str);
    this.sortString=new String(str);
    if(isSameLanguage(( )
        this.altString=new String(str);
    else
        this.altString=transmogrify(str,
            this.sourceLanguage,
            this.targetLanguage);
}
```

The "transmogrify" method is the internal method within transliteration engine 220 which was described above. The character set into which the entered characters are transliterated is determined from the targetLanguage property 218, which in the exemplary embodiment is assumed to be set to English. Given an appropriate resource file 222, however, characters may be transliterated between any two languages for which characters in one language sound-map to one or more characters in the other.

Table III illustrates how data is entered into IString class 202 by data entry methods 210 where the language utilizes a non-latin character set which maps to the latin character set, such as Russian Cyrillic.

TABLE III

| Field | Type | Data |
|---|---|---|
| baseString | Java String | Давид Кумгыр |
| sortString | Java String | Давид Кумгыр |
| altString | Java String | David Kumhyr |
| sourceLocale | Java String | RU |
| sourceLanguage | Java String | ru |
| targetLocale | Java String | US |
| targetLanguage | Java String | en |

In the example shown, the text entered by the user is inserted into both baseString 204 and sortString 206, but the text entered into altString 208 is selected by transliteration engine 220 utilizing a resource table of Russian Cyrillic to English character sound mappings. The phonetic representation of the baseString 204 is thus entered into altString 208 as a pronunciation key for users unfamiliar with the Cyrillic character set.

For languages which do not employ the latin character set or a character set which may be sound-mapped to the latin character set, data entry methods 210 input data into the baseString 204, sortString 206, and altString 208 fields which is derived from the input method editor (IME) 224. IME 224 may be either a customized input method editor or the input method editor which is integrated into Asian versions of the Windows NT operating system available from Microsoft Corporation of Redmond Washington. If the Windows NT input method editor is employed, the appropriate data must be extracted from the Windows NT input method editor internal data storage.

Table IV illustrates how data is entered into IString class 202 by data entry methods. 210 for logosyllabic languages, such as Japanese, which employ neither the latin character set nor a character set which may be sound-mapped to the latin character set.

TABLE IV

| Field | Type | Data |
|---|---|---|
| baseString | Java String | <Kanji> |
| sortString | Java String | はやし |
| altString | Java String | hayashi |
| sourceLocale | Java String | JP |
| sourceLanguage | Java String | ja |

TABLE IV-continued

| Field | Type | Data |
|---|---|---|
| targetLocale | Java String | US |
| targetLanguage | Java String | en |

Logosyllabic languages do not have alphabets, but instead have very large character sets with symbols ("ideographs") corresponding to concepts and objects rather than simple sounds. For instance, the Joyo Kanji List (Kanji for Daily Use) adopted for the Japanese language in 1981 includes 1945 symbols. Normal computer keyboards cannot contain enough separate keys to have one for each symbol in the language, so input is accomplished phonetically utilizing keystroke combinations to select characters from one of two phonetic syllabaries, hiragana or katakana, and dictionary lookup for Kanji symbol creation. The process is implemented in the Windows NT input method editor identified above.

For logosyllabic or ideograhic languages, therefore, the data entered into altString 208 is the latin characters typed by the user to compose the desired ideograph. The data entered into sortString 206 are the syllabary characters phonetically spelling the desired ideograph, providing an intermediate representation of the ideograph. The data entered into baseString 204 is the final ideograph selected by the user. As with transliteration of non-latin characters as described above, non-latin characters may be entered into altString 208 if the targetLanguage property is set to a language other than English and IME 224 supports composition of the ideographs by phonetic spelling in a language other than English. For instance, an IString object 202 might contain Japanese Kanji in baseString 204, hiragana in sortString 206, and Cyrillic characters in altString 208 if IME 224 permits composition of Japanese Kanji characters by phonetic spelling in Russian.

A suitable constructor for receiving baseString 204, sortString 206 and altString 208 from IME 224 via data entry methods 210 for entry into an IString object 202 may be:

```
/ * * *
*
* <P> </P>
* <dt> <b> Description: </b> <dd>
* <p> Allocate a new IString. The baseString, sortString
    and
* altString are entered from the IME utilizing the default
    language and
*locale. </p>
*
* * *
public IString(String base,
    String sort,
    String alt,
    Locale src,
    Locale tgt) {
this.baseString=base;
this.sortString=sort;
this.altString=alt;
this.sourceLocale=src.getLocale( );
this.sourceLanguage=src.getLanguage( );
this.targetLocale=tgt.getLocale( );
this.targetLanguage=tgt.getLanguage( );
init( );
}
```

The contents of baseString 204, sortString 206 and altString 208 are entered into the respective fields from data derived from IME 224, while the contents of sourceLocale 212 and sourceLanguage 214 are entered from the default locale and language properties specified by the host system in which data is being entered into IString object 202. The contents of targetLocale 216 and targetLanguage 218 will typically be a locale/language code for a language utilizing the latin character set such as "en_US" (English—United States).

Regardless of the language in which text is entered into an IString class object 202, the data automatically entered into each of the baseString 204, altString 206, and sortString 208 by data entry methods 210 may be overridden or altered using other methods. The fields of an IString object 202 may preferably be individually and independently edited, allowing artificial promotion within sortString field 206 as described above, replacement of an erroneously selected ideograph in baseString field 204, or correction of a phonetic spelling within altString field 208.

While the above-described methods assumed that the source and target languages were taken from host system defaults, data may alternatively be entered into baseString 204, sortString 206 and altString 208 for specified source and target languages utilizing the constructor:

```
/ * * *
*
* <P> </P>
* <dt> <b> Description: </b> <dd>
* <p> Allocate a new IString. The baseString, sortString
    and
* altString are entered from the IME for specified target
    and source
* language and locale. </p>
*
* * *
public IString(String base,
    String sort,
    String alt,
    String srcLanguage,
    String srcLocale,
    String tgtLanguage,
    String tgtLocale) {
this.baseString=base;
this.sortString=sort;
this.altString=alt;
this.sourceLocale=srcLocale;
this.sourceLanguage=srcLanguage;
this.targetLocale=tgtLocale;
this.targetLanguage=tgtLanguage;
init( );
}
```

In this constructor, the source and target language and locale which are employed to select the characters entered into baseString 204, sortString 206 and altString 208 may be specified. This latter constructor may be employed to create an IString object 202 in other than the host system default language, or in host systems where data for the IString object 202 is received from another system and a local instance is created.

It should be noted that transliteration engine 220 and messaging methods 226 need not necessarily be implemented within an IString class 202 as depicted in FIG. 2, and that IME method 220 need not be implemented separately. Transliteration engine 220 and messaging methods 226 may instead be implemented within separate subclasses which are appropriately constructed and/or invoked by IString class 202 as necessary, while IME 224 may be implemented as a method within IString class 202.

Transliteration engine 220.and IME 224 and are only required by data entry methods 210 to gather input data for IString class 202 objects under certain locale and language property settings. Otherwise, data may be programmatically input into baseString 204, sortString 206, and altString 208 by invoking the proper constructor. The methods which may be invoked by programs at runtime to programmatically get and set fields within IString 202 include:

```
/ * * *
 *
 * <P> </P>
 * <dt> <b> Description: </b> <dd>
 * <p> Get the IString baseString. </p>
 *
 * @returns str String containing the base string
 *
 * * *
    public String getBaseString( ) {
       return this.baseString;
    }
```

This method returns the contents for baseString 204 for an IString object 202. Similar methods return the contents of sortString 206 and altString 208:

```
/ * * *
 *
 * <P> </P>
 * <dt> <b> Description: </b> <dd>
 * <p> Get the IString sortString. </p>
 *
 * @returns str String containing the sort string
 *
 * * *
    public String getSortString( ) {
       return this.sortString;
    }
/ * * *
 *
 * <P> </P>
 * <dt> <b> Description: </b> <dd>
 * <p> Get the IString altString. </p>
 *
 * @returns str String containing the alt string
 *
 * * *
    public String getAltString( ) {
       return this.altString;
    }
```

The methods also include setting baseString 204:

```
/ * * *
 *
 * <P> </P>
 * <dt> <b> Description: </b> <dd>
 * <p> Set the IString baseString. </p>
 *
 * @param str String containing the base string
 *
 * * *
    public void setBaseString(String sBase) {
       this.baseString=sBase;
    }
``` as well as sortString 206 and altString 208:

```
/ * * *
 *
 * <P> </P>
 * <dt> <b> Description: </b> <dd>
 * <p> Set the IString sortString. </p>
 *
 * @param str String containing the sort string
 *
 * * *
    public void setSortString(String sSrt) {
       this.sortString=sSrt;
    }
/ * * *
 *
 * <P> </P>
 * <dt> <b> Description: </b> <dd>
 * <p> Set the IString sortString. </p>
 *
 * @param str String containing the alt string
 *
 * * *
    public void setAltString(String sAlt) {
       this.altString=sAlt;
    }
```

In addition to getting and setting baseString 204, sortString 206, and altString 208 for an IString object 202, programs may need to get or set the display locale or language of an IString object 202. Accordingly, other methods are provided to permit a program to get and/or set the locale or language properties of IString data:

```
/ * * *
 *
 * <P> </P>
 * <dt> <b> Description: </b> <dd>
 * <p> Get the locale of the IString data. </p>
 *
 * @returns loc Locale containing the locale of the data
 *
 * * *
    public Locale getLocale( ) {
       Locale loc=new Locale(this.sourceLanguage,
          this.sourceLocale);
       return loc;
    }
/ * * *
 *
 * <P> </P>
 * <dt> <b> Description: </b> <dd>
 * <p> Set the locale of the IString data.</p>
 * @param loc Locale of the data
 *
```

```
* * *
public void setLocale(Locale loc) {
   this.sourceLocale=loc.getLocale( );
   this.sourceLanguage=loc.getLanguage( );
   }
/ * * *
*
* <P> </P>
* <dt> <b> Description: </b> <dd>
* <p> Get the display language of the IString data.</p>
*
* @returns Display language of the data
*
* * *
public String getDisplayLanguage( ) {
   Locale loc=new Locale(this.sourceLanguage,
     this.sourceLocale);
   return loc.getDisplayLanguage( );
   }
/ * * *
*
* <P> </P>
* <dt> <b> Description: </b> <dd>
* <p> Get the display locale of the IString data. </p>
* @returns Display locale of the data
*
public String getDisplayLocale( ) {
   if(this.sourceLanguage==null&&this.sourceLocale==
     null)
     return null;
   else{
     Locale loc=new Locale(this.sourceLanguage,
       this.sourceLocale);
     return loc.getDisplayLocale( );
     }
   }
```

While these methods are available, IString class 202 preferably exhibits a "black box" behavior such that the programmer/user need not know anything about the methods implemented for IString class 202. IString class 202 simply appears as a data type which encapsulates extra information about baseString 204 and also includes some methods for transforming characters from one character set to another.

For special cases where the sortString field 206 or altString field 208 are to be exposed to the user in addition to or in lieu of baseString 204, either for editing or for display only, a separate set of controls may be provided.

In the present invention, IString class 202 is employed to effectively transfer human language data across systems employing incongruous languages. The contents of baseString 204 provide a native representation of the text in the default language of the system originating the IString object 202. However, for each system participating in the exchange of data with other systems running in different human languages, the targetLocale property 216 and targetLanguage 218 property of an IString object 202 are preferably set to a common value (e.g., targetLocale="US", targetLanguage="en"). The contents of altString 208 will thus contain a common, cross-language representation of the text string. In systems where the default language of a system receiving an object differs from the language of the contents of baseString 204, IString class object 202 may automatically switch to presenting the contents of altString 208 as the text string to be displayed or processed.

Although described above in the context of a multi-field text string class intended to store the transliterated character string, any display field in which a character string is entered by a user may similarly utilize the resource tables to character map an entered character string to corresponding latin characters to serve as a pronunciation key.

Figure 3:
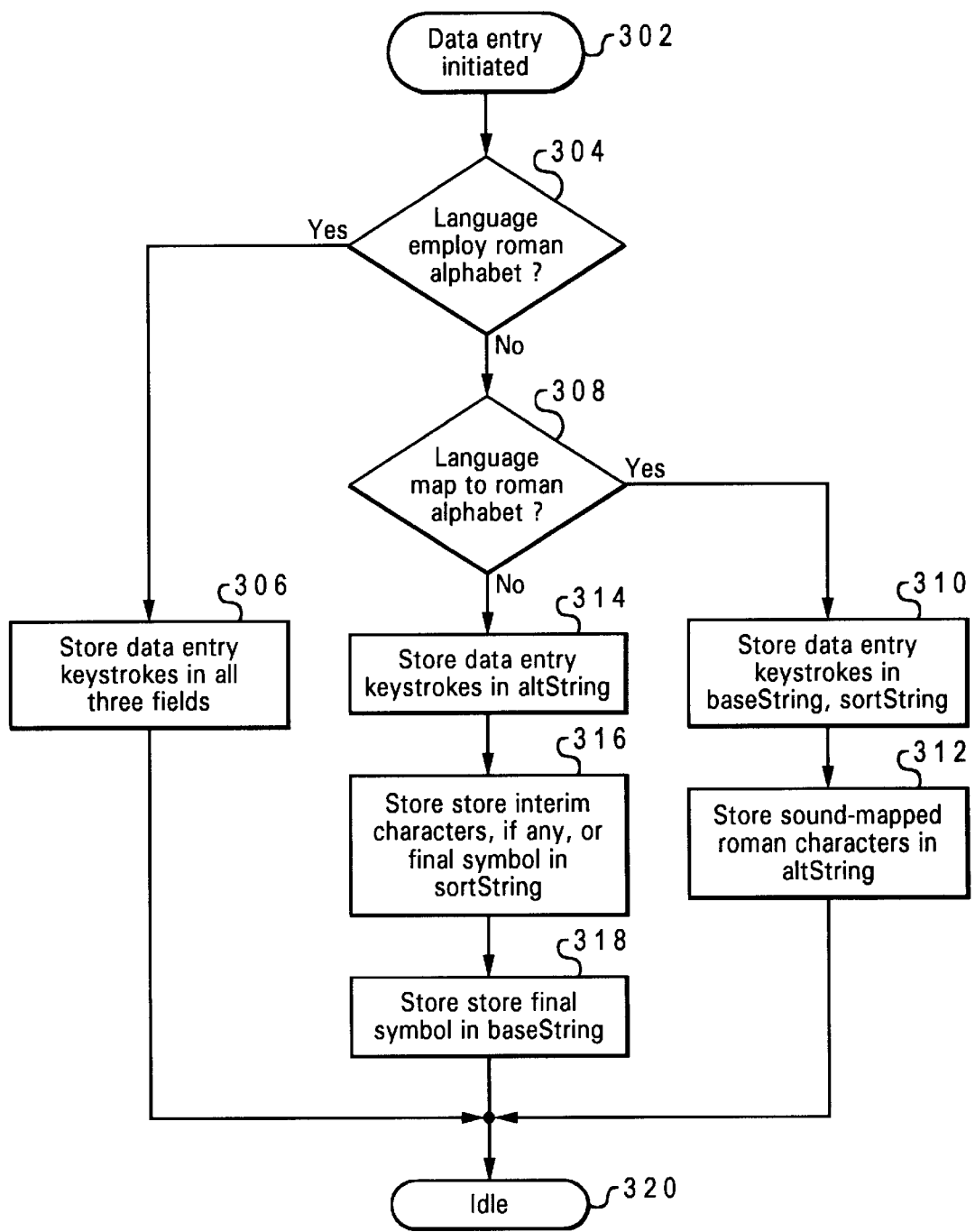
FIGS. 3 depicts a high level flowchart for a process of entering data in a character string display field of a multi-field text string class with automatic character transliteration in accordance with a preferred embodiment of the present invention.

Referring to FIG. 3, a high level flowchart for a process of entering data into a three-field text string class in accordance with a preferred embodiment of the present invention is depicted. FIG. 3 is intended to be read in conjunction with FIG. 2. The process shown in FIG. 3 begins at step 302, which depicts initiation of data entry into a three-field text string class (IString) object 302. The process then passes to step 304, which illustrates a determination of whether the currently selected language, specified by the operating system or application environment language and/or locale properties, employs the latin alphabet character set. Languages supported by a given system may be categorized to facilitate this determination, and the category employing the latin alphabet should include English and the romance languages (Spanish, French, Italian, etc.). If the current language employs the latin alphabet character set, the process proceeds to step 306, which depicts inserting the text entered by the data entry keystrokes into all three fields—baseString 204, sortString 206, and altString 208—of IString object 202. Thus, in most locales and/or languages for a locale, data is input programmatically by invoking the appropriate constructor and the baseString text is inserted into the other two fields by default.

Referring back to step 304, if the currently-selected language for data entry into the IString object does not utilize the latin alphabet character set, the process proceeds instead to step 308, which illustrates a determination of whether the currently selected language maps to the latin alphabet character set. This category of languages will most likely include, for example, Cyrillic, Greek, Hebrew, and many Germanic and Arabic languages. If so, the process proceeds to step 310, which depicts storing the text of the data entry keystrokes into the baseString and sortString fields 204 and 206, and then to step 212, which illustrates storing the entered text sound-mapped to latin alphabet characters in the altString field 208.

It should be noted that there may be some overlap between the first an second categories of languages, or—stated differently—some language-dependent variation in the manner in which language entry is handled. For example, for Spanish text, while most characters may be entered directly into all three fields of an IString class object, the "ñ" character may be sound mapped to "ny" in the altString field of an IString object to provide information regarding proper pronunciation. Alternatively, the altString field may be filled with a traditional phonetic pronunciation guide to the data entered into the IString object (e.g., "küm-er" or "koo-mer") to provide pronunciation information for words in languages employing the latin alphabet character set as well as for ideographs.

Referring back to step 308, if the current language does not map readily to the latin alphabet character set (e.g., the language employs an ideographic character set), the process proceeds instead to step 314, which depicts storing the data entry keystrokes in the altString field 208 as a pronunciation guide, then to step 316, which illustrates storing intermediate characters (such as hiragana or katakana characters) in the sortString field 206, and finally to step 318, which depicts storing the ideograph in the baseString field 204. Steps 314, 316 and 318 illustrates the operation of the IME in storing data in an IString object.

From any of steps 306, 312, or 318, the process proceeds to step 320, which illustrates the process becoming idle until data entry to an IString class object is again initiated. The distinct data entry behavior of the IString class based on the locale or language property allows language specific characters to be automatically mapped to recognizable characters and saved as a pronunciation key. A user may thus view the character-mapped representation of an abstract object name to be able to recognize a specific object, despite a lack of familiarity with the character set in which the object name text string was entered.

Figure 4A:
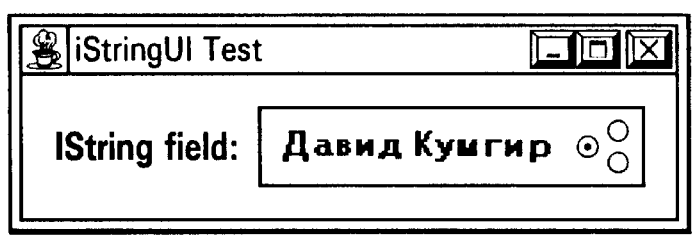
FIGS. 4A–4B are portions of a user interface showing one application for character-mapped data entry into alternate fields of a three-field text string class in accordance with a preferred embodiment of the present invention.
Figure 4B:
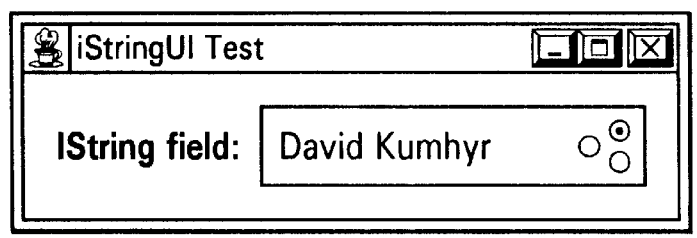

Referring to FIGS. 4A and 4B, portions of a user interface showing one application for character-mapped data entry into alternate fields of a three-field text string class in accordance with a preferred embodiment of the present invention are illustrated. The user interface display an IString object in which entered text was saved in the baseString field and transliterated characters for the entered text was automatically saved in the altString field as described above.

In FIG. 4A, the baseString field contents ("("ДавидКумгир")") is displayed. A user unfamiliar with the Cyrillic character set would not be able to recognize this name. However, by altering the user interface so that the altString field contents ("David Kumhyr") is displayed as shown in FIG. 4B, the user can recognize the name of an object which they wish to manipulate. The automatically transliterated characters saved in the altString field provide a recognizable representation of the text string, as well as a pronunciation key.

It is important to note that while the present invention has been described in the context of a fully functional data processing system and/or network, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A system for encapsulating text string representations, comprising:
   means for storing a text string entered in a first character set for a first human language in which the text string was entered within a first field of a multi-field data packet in the first character set;
   means for automatically mapping characters of the entered text string from the first character set to a second character set different than the first character set for a second human language to generate a mapped text string and for automatically sound-mapping characters within the entered text string from the first character set for the first human language to the second character set for the second human language;
   means for storing the mapped text string within a second field of the multi-field data packet in the second character set; and
   means for storing a sort value for said text string in a third field of said multi-field data packet.

2. The system of claim 1 wherein the means for storing a text string entered in a first character set within a first field of a multi-field data packet further comprises:
   means for storing the text string in Unicode characters for a human language in which the text string was entered.

3. The system of claim 1, wherein the means for automatically mapping characters of the entered text string from the first character set to a second character set different than the first character set for a second human language to generate a mapped text string further comprises:
   means for mapping Unicode characters within the entered text string belonging to the first character set for the first human language to Unicode characters belonging to the second character set for the second human language utilizing a mapping table.

4. The system of claim 1, wherein the means for storing the mapped text string within a second field of the multi-field data packet in the second character set further comprises:
   means for storing latin characters corresponding to human language characters in which the entered text string was entered, wherein the entered text string was entered utilizing human language characters other than latin characters.

5. The system of claim 1, wherein the means for storing the mapped text string within a second field of the multi-field data packet in the second character set further comprises:
   means for storing the mapped text string as a pronunciation key in the second human language for the entered text string.

6. A computer program product within a computer usable medium for encapsulating text string representations, comprising:
   instructions for storing a text string entered in a first character set for a first human language in which the text string was entered within a first field of a multi-field data packet in the first character set;
   instructions for automatically mapping characters of the entered text string from the first character set to a second character set different than the first character set for a second human language to generate a mapped text string and for automatically sound-mapping characters within the entered text string from the first character set for the first human language to the second character set for the second human language;
   instructions for storing the mapped text string within a second field of the multi-field data packet in the second character set; and
   instructions for storing a sort value for said text string in a third field of said multi-field data packet.

7. The computer program product of claim 6, wherein the instructions for storing a text string entered in a first character set for a first human language in which the text string was entered within a first field of a multi-field data packet in the first character set further comprise:
   instructions for storing the text string in Unicode characters for the first character set employed by the first human language in which the text string was entered.

8. The computer program product of claim 6, wherein the instructions for mapping characters of the entered text string from the first character set to a second character set to generate a mapped text string further comprise:
   instructions for mapping Unicode characters within the text string for a first human language to Unicode characters for a second human language utilize a mapping table.

9. The computer program product of claim 6, wherein the instructions for storing the mapped text string within a second field of the multi-field data packet in the second character set further comprise:

instructions for storing latin characters corresponding to human language characters in which the entered text string was entered, wherein the entered text string was entered utilizing human language characters other than latin characters.

10. A method of storing text, comprising:

receiving an entered character string;

determining whether the entered character string comprises Latin characters;

responsive to determining that the entered character string comprises Latin characters, storing the entered character string in each field of a multi-field string class;

responsive to determining that the entered character string does not comprise Latin characters:

storing the entered character string in a first field of the multi-field string class;

determining whether the entered character string comprises characters which may be sound-mapped to Latin characters;

responsive to determining that the entered character string comprises characters which may be sound-mapped to Latin characters:

transliterating the entered characters to corresponding Latin characters;

storing the corresponding Latin character in a second field of the multi-field text class; and storing a sort value for said entered text string in a third field of the multi-field text class.

* * * * *